United States Patent
Xu (10) Patent No.: US 9,024,734 B2
(45) Date of Patent: May 5, 2015

(54) REMOTE CONTROL DEVICE, A FAR-END DEVICE, A MULTIMEDIA SYSTEM AND A CONTROL METHOD THEREOF

(75) Inventor: Chun Xu, Shanghai (CN)

(73) Assignee: Sony Corporation, Tokyo (JP)

( * ) Notice: Subject to any disclaimer, the term of this patent is extended or adjusted under 35 U.S.C. 154(b) by 150 days.

(21) Appl. No.: 13/530,703

(22) Filed: Jun. 22, 2012

(65) Prior Publication Data
US 2012/0326851 A1 Dec. 27, 2012

(30) Foreign Application Priority Data
Jun. 23, 2011 (CN) .......................... 2011 1 0170944

(51) Int. Cl.
| | | |
|---|---|---|
| *G05B 11/01* | (2006.01) | |
| *H04L 29/08* | (2006.01) | |
| *H04N 21/4782* | (2011.01) | |
| *H04N 21/218* | (2011.01) | |
| *H04N 21/4227* | (2011.01) | |
| *H04N 21/61* | (2011.01) | |
| *H04N 21/63* | (2011.01) | |
| *H04N 21/478* | (2011.01) | |

(52) U.S. Cl.
CPC .......... *H04L 67/025* (2013.01); *H04N 21/4782* (2013.01); *H04N 21/2181* (2013.01); *H04N 21/4227* (2013.01); *H04N 21/6125* (2013.01); *H04N 21/6175* (2013.01); *H04N 21/632* (2013.01); *H04L 67/26* (2013.01); *H04N 21/4781* (2013.01)

(58) Field of Classification Search
USPC ........... 340/12.22–12.31, 3.1, 10.1, 500, 506; 725/39, 51, 58, 88
See application file for complete search history.

(56) References Cited

U.S. PATENT DOCUMENTS

| | | | | |
|---|---|---|---|---|
| 4,916,631 | A * | 4/1990 | Crain et al. .................. | 700/265 |
| 4,953,097 | A * | 8/1990 | Crain et al. .................. | 700/265 |
| 5,640,139 | A * | 6/1997 | Egeberg .................. | 340/426.19 |
| 5,802,291 | A * | 9/1998 | Balick et al. .................. | 709/202 |
| 5,825,983 | A * | 10/1998 | Park et al. ..................... | 700/264 |
| 5,880,685 | A * | 3/1999 | Weeks ........................ | 341/22 |
| 6,160,552 | A * | 12/2000 | Wilsher et al. ................ | 715/739 |
| 6,321,275 | B1 * | 11/2001 | McQuistan et al. .......... | 719/330 |
| 6,675,193 | B1 * | 1/2004 | Slavin et al. ................. | 709/200 |
| 6,788,068 | B2 * | 9/2004 | Arai .............................. | 324/430 |
| 6,970,183 | B1 * | 11/2005 | Monroe ......................... | 348/143 |

(Continued)

FOREIGN PATENT DOCUMENTS

| | | | | |
|---|---|---|---|---|
| EP | 735469 | A2 * | 10/1996 | ................ G06F 9/46 |
| JP | 59205633 | A * | 11/1984 | ................ G06F 3/02 |

*Primary Examiner* — Paul Obiniyi
(74) *Attorney, Agent, or Firm* — Oblon, McClelland, Maier & Neustadt, L.L.P.

(57) ABSTRACT

The present invention provides a remote control device, a far-end device, a multimedia system and a control method thereof. Said remote control device comprising: a communication unit for establishing a connection with a far-end device and performing communication; an operating unit for operating a specific program in said far-end device by the operation of the user; and a mode change unit for switching a operating mode in said remote control device according to feedback information associated with the specific program which is fed back by said far-end device in response to the operation in said operating unit. Through the remote control device, the far-end device, the multimedia system and the control method thereof, it may be operated in any device possessing communication function in despite of the hardware and system configuration of said device.

18 Claims, 10 Drawing Sheets

(56) References Cited

U.S. PATENT DOCUMENTS

| | | | |
|---|---|---|---|
| 7,388,521 B2* | 6/2008 | Lu et al. | 341/51 |
| 7,526,934 B2* | 5/2009 | Conforti | 70/279.1 |
| 7,633,385 B2* | 12/2009 | Cohn et al. | 340/506 |
| 7,855,635 B2* | 12/2010 | Cohn et al. | 340/506 |
| 7,956,736 B2* | 6/2011 | Cohn et al. | 340/506 |
| 7,979,612 B2* | 7/2011 | Kerdemelidis et al. | 710/67 |
| 8,027,809 B2* | 9/2011 | Brown | 702/188 |
| 8,151,306 B2* | 4/2012 | Rakib | 725/71 |
| 8,356,324 B2* | 1/2013 | Rajakarunanayake | 725/88 |
| 8,367,995 B2* | 2/2013 | Elshafei | 250/203.4 |
| 8,407,380 B2* | 3/2013 | Matsunaga et al. | 710/62 |
| 8,559,936 B2* | 10/2013 | Faenger | 455/419 |
| 2002/0019984 A1* | 2/2002 | Rakib | 725/111 |
| 2002/0031120 A1* | 3/2002 | Rakib | 370/386 |
| 2003/0048295 A1* | 3/2003 | Lilleness et al. | 345/738 |
| 2003/0117427 A1* | 6/2003 | Haughawout et al. | 345/710 |
| 2003/0193519 A1* | 10/2003 | Hayes et al. | 345/721 |
| 2003/0206122 A1* | 11/2003 | Emerson | 341/22 |
| 2005/0055716 A1* | 3/2005 | Louie et al. | 725/58 |
| 2006/0101498 A1* | 5/2006 | Arling et al. | 725/81 |
| 2007/0061491 A1* | 3/2007 | Kerdemelidis et al. | 710/1 |
| 2007/0078829 A1* | 4/2007 | Stern et al. | 707/3 |
| 2007/0096872 A1* | 5/2007 | Nguyen et al. | 340/5.61 |
| 2008/0005764 A1* | 1/2008 | Arling et al. | 725/39 |
| 2008/0079612 A1* | 4/2008 | Lu et al. | 341/50 |
| 2008/0204219 A1* | 8/2008 | Cohn et al. | 340/506 |
| 2008/0316062 A1* | 12/2008 | Chen et al. | 341/22 |
| 2009/0080864 A1* | 3/2009 | Rajakarunanayake | 386/124 |
| 2009/0160681 A1* | 6/2009 | Chen et al. | 341/23 |
| 2009/0259792 A1* | 10/2009 | Matsunaga et al. | 710/316 |
| 2009/0282293 A1* | 11/2009 | Martch et al. | 714/43 |
| 2010/0066530 A1* | 3/2010 | Cohn et al. | 340/500 |
| 2010/0109903 A1* | 5/2010 | Carrick | 340/825.49 |
| 2010/0180307 A1* | 7/2010 | Hayes et al. | 725/51 |
| 2010/0321574 A1* | 12/2010 | Kerofsky | 348/563 |
| 2010/0321587 A1* | 12/2010 | Kerofsky | 348/730 |
| 2011/0092164 A1* | 4/2011 | Spanhake | 455/67.11 |
| 2011/0107159 A1* | 5/2011 | Martch et al. | 714/57 |
| 2011/0234392 A1* | 9/2011 | Cohn et al. | 340/506 |
| 2011/0294490 A1* | 12/2011 | Faenger | 455/419 |
| 2012/0019365 A1* | 1/2012 | Tuikka et al. | 340/10.1 |
| 2012/0278473 A1* | 11/2012 | Griffiths | 709/224 |
| 2014/0052624 A1* | 2/2014 | Bansal et al. | 705/39 |
| 2014/0052856 A1* | 2/2014 | Bansal et al. | 709/224 |
| 2014/0052857 A1* | 2/2014 | Bansal et al. | 709/224 |
| 2014/0068003 A1* | 3/2014 | Bansal et al. | 709/217 |

* cited by examiner

REMOTE CONTROL DEVICE, A FAR-END DEVICE, A MULTIMEDIA SYSTEM AND A CONTROL METHOD THEREOF

TECHNICAL FIELDS

This invention relates to a remote control device, a far-end device controlled by the preset remote control device, a multimedia system and a control method thereof comprising a remote control device and a far-end device thereof.

BACKGROUND OF THE INVENTION

In recent years, mobile phones and other portable device have become indispensable tools in the daily life. Along with the continuous advancement of technology, mobile phones have not only been limited to the purpose of communication, such as phone calls, transmit short message service (SMS) etc., and along with the emergence of smart mobile phones, mobile phones can play a variety of roles, such as game center, media center, office assistant, and so on by installing a variety of software. In addition, on the basis of smart mobile phone, larger screen tablet personal computer and other portable devices have greatly enriched the variety of mobile portable devices.

In addition, due to the limitation of size and performance of the screen, portable devices still can not satisfy many demands, and there are still many applications needed to be performed by, for example, televisions and other equipment. On the other hand, the keys of the device, such as the traditional television remote control device are fixedly arranged, and a variety of the obstacle of usage will be produced because of the difference of the operated program. For example, the traditional remote control device as mentioned above often sets up keys corresponding to the various functions as much as possible, accordingly, it certainly will render each key become very small. When the program needed to be remotely controlled, such as music playing which does not need to use all of the keys, it is very difficult for those who are not familiar with the present remote control device to find the specific key corresponding to the present program, moreover, since the key is very small, it is not easy to be operated either. In addition, the connection mode between remote control device and television usually adopt an infrared connection, which also renders the signal of the remote control device not able to successfully reach the television sometimes due to the environmental condition.

For all of the reasons mentioned above, the mobile phone having a touch screen which can switch screens and a variety of data connection mode has become a candidate to replace the traditional remote control device as mentioned above. Moreover, the demand to perform remote control to television and other equipment via portable device such as mobile phone increases, and along with it, a variety of software which can be installed to a portable device so as to perform remote control to television and other equipment emerges as the times requires.

There are a lot of existing technology described such kind of technology, such as CN201789547U of China discloses an invention that a mobile phone can also act as television remote control device. However, according to the contents as described in the specification thereof, the foundation of the present technology is that it needs to design a specific set of hardware platform to support the function of remote control, accordingly, which makes the present technology have only a little versatility.

In addition, the document of U.S. Pat. No. 6,989,763 B2 of United States has also disclosed a web-based universal remote control device, but in order to be used, it needs to install a remote control device program in a particular PDA operation platform in order to be used. Due to the restrictions of the operating platform, the application scope of the present technology is also greatly reduced.

In addition to the two technical document of existing technology mentioned above, all of the software, which can perform remote control to the media device appeared on the market are all developed based on a specific platform, can be normally used only when they are pre-installed in the corresponding system, accordingly, all of them do not have common feature.

SUMMARY OF THE INVENTION

The present invention is completed in view of the above problem, and purpose thereof is to provide a remote control device which can be operated on any device with communication function and has no relationship with the hardware and system configuration of the present device, a far-end device controlled by the preset remote control device, a multimedia system and a control method thereof comprising a remote control device and a far-end device thereof.

In order to realize the purpose of the present invention, the present invention provides a remote control device, said remote control device comprises: a communication unit for establishing a connection with a far-end device and performing communication; an operating unit for operating a specific procedure in said far-end device by the operation of the user; and a mode change unit for switching a operating mode in said remote control device according to feedback information associated with the specific procedure which is fed back by said far-end device in response to the operation in said operation in said operating unit.

In addition, the present invention provides a far-end device, said far-end device comprising: a communication unit for establishing a connection with a remote control device and performing communication; and a feedback unit for feeding back a feedback information associated with the specific procedure to the remote control device according to the operation of the specific procedure in said far-end device performed by said remote control device.

In addition, the present invention provides a multimedia system, said multimedia system comprises a remote control device and a far-end device, wherein said remote control device comprising: a communication unit of far-end device side for establishing a connection with a remote control device and performing communication; and a feedback unit for feeding back a feedback information associated with the specific procedure to the remote control device according to the operation of the specific procedure in said far-end device performed by said remote control device; said remote control device comprising: a communication unit of remote control device side for establishing a connection with the far-end device and performing communication; an operating unit for operating a specific procedure in said far-end device by the operation of the user; and a mode change unit for switching a operating mode in said remote control device according to feedback information fed back from said far-end device.

In addition, the present invention provides a control method in a multimedia system, said multimedia system comprises a remote control device and a far-end device, wherein said control method comprising: a connection step for establishing a communication connection between said remote control device and said far-end device; an operating step for operating a specific procedure in said far-end device via the operation to said remote control device performed by the user; a feedback step for feeding back feedback information associated with the specific procedure which is fed back by said far-end device in response to the operation of the user in said operating unit, and a mode change step for switching a operating mode of said remote control device per se according to said feedback information.

The present invention can provide a remote control device which can be operated on any device with communication function and has no any relationship with the hardware and system configuration of the present device, a far-end device controlled by the preset remote control device, a multimedia system and a control method thereof comprising a remote control device and a far-end device thereof.

DETAILED DESCRIPTION OF THE PREFERRED EMBODIMENT

Hereinafter, the present invention will be explained combined with a specific embodiment and the drawings. It should be noted that the following explanation is only the exemplification for making the technical content and the technical idea definite, and the specific numerical value as well as technical standard cited wherein are just an example is just an example, and the scope of the present invention should be not limited to the specific values as well as the technical standard as mentioned above.

Figure 1:
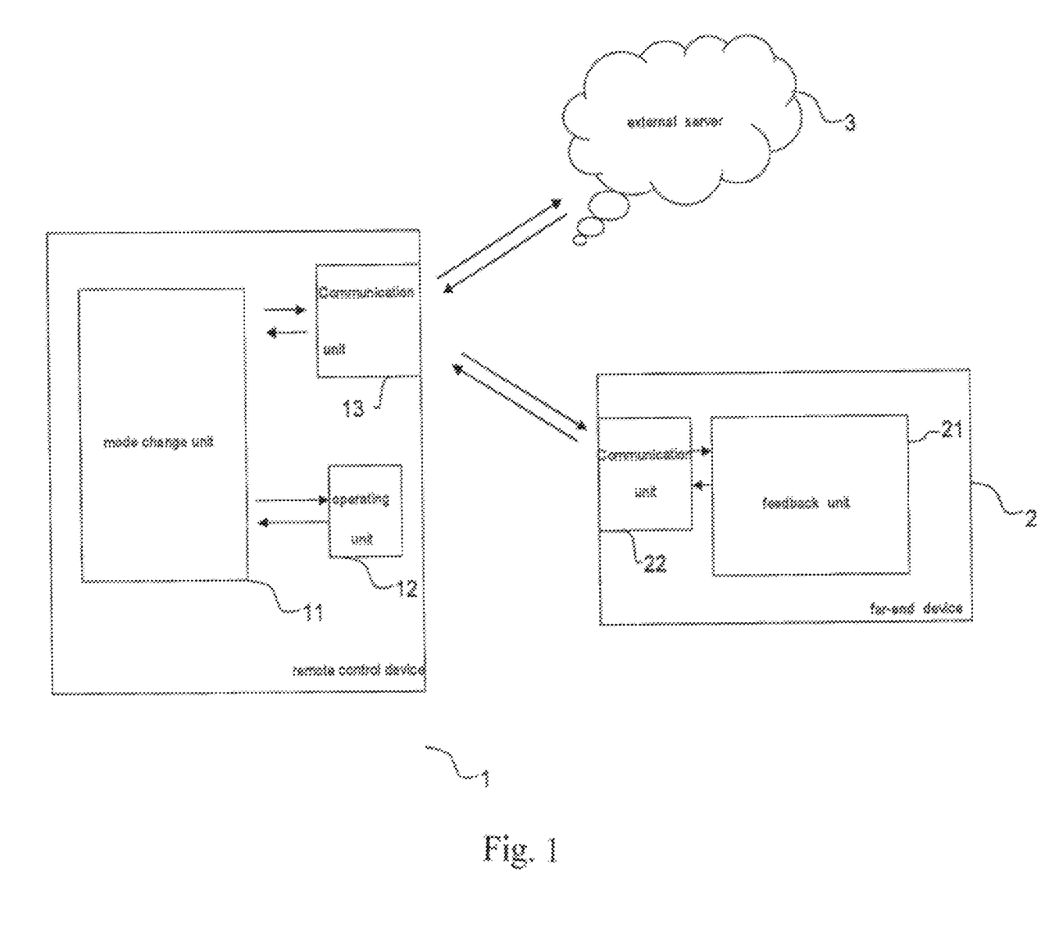
FIG. 1 is a block diagram representing the multimedia system of the present invention.

FIG. 1 is a block diagram representing the multimedia system of the present invention. FIG. 1 shows a multimedia system of the present invention which comprises a remote control device 1 as well as a far-end device 2 which is a controlled device. The switch of the screen of a remote control device, the sound of operation and the mode of operation can be performed through the interactive communication between the remote control device 1 and the far-end device 2. Here, mobile phones and tablet personal computer can be cited as the example of the remote control device 1, and television can be cited as the example of the controlled device 2. However, the remote control device 1 and the controlled device 2 are not limited to these examples, and it is possible for those devices as long as they support the widely used data transfer protocol such as HTTP and have a function of data communication.

As shown in FIG. 1, the remote control device 1 includes a mode change unit 11, a user interface, i.e. an operating unit 12 for the user to input operating instruction, and a communication unit 13 for communicating with the far-end device 2 or an external server 3. Wherein the mode change unit 11 changes the operation mode of the remote control device 1 based on the information obtained from the far-end device 2 based on the communication between the communication unit 13 and the far-end device 2. In addition, as shown in FIG. 1, the far-end device 2 includes a feedback unit 21 and a communication unit 22 for establishing a connection with a remote control device and performing communication. Wherein the feedback unit 21 feeds back feedback information associated with the specific procedure to the remote control device 1 according to the operation of the specific procedure in said far-end device 2 performed by said remote control device 1. In addition, communication mode between the communication unit 13 and the far-end device 2 or the external server 3 can be cable network, Wifi, Bluetooth, infrared and a variety of other connection modes.

Figure 2:
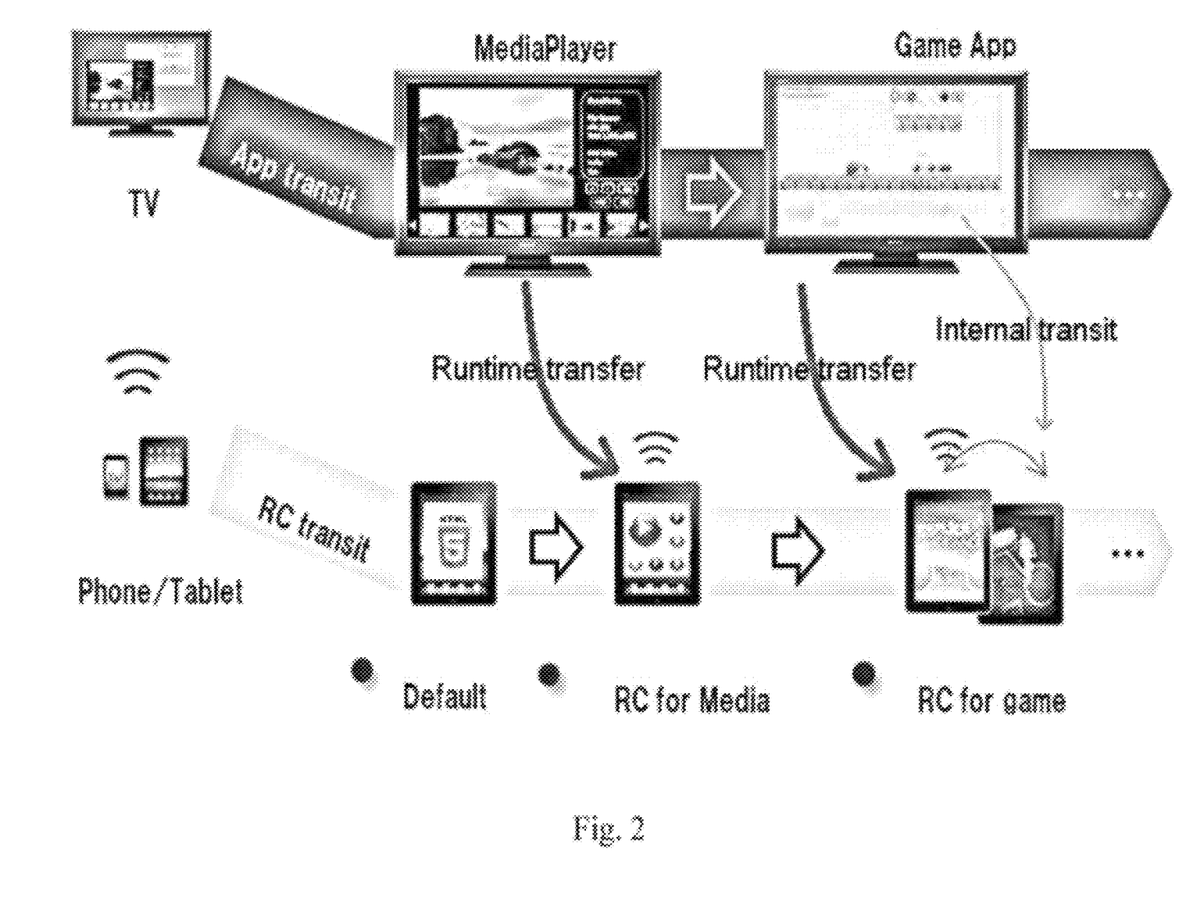
FIG. 2 represents a schematic diagram of the control between a remote control device and a far-end device in the multimedia system of the present invention.

Hereinafter, the specific operation of the multimedia system of the present invention is explained with reference to FIG. 2. FIG. 2 represents a schematic diagram of the control between a remote control device and a far-end device in the multimedia system of the present invention. As shown in FIG. 2, the remote control device 1 can be run on the electronic equipment such as mobile phones and tablet computers which support HTML5 browser, and the object being operated and controlled can be a far-end device with a WS system, such as television.

User establishes WebSocket connection between the remote control device 1 and the far-end device 2 through performing operation to operating unit 12. After the WebSocket connection is established, the user can operate the operating system running in the far-end device 2 through the operation of button, voice or sensors operating etc. As an example, the instruction can be input by operating the browser using the operating unit 12 in the remote control device 1 so as to be connected to the far-end device 2. However, those skilled of the art should know that the connection mode is not only limited to be performed by the browser, which can also be carried out by other interface or operation mode. As an example, a QR Code (QR Code is a kind of two-dimensional bar code, QR is the abbreviation of "Quick Response", i.e. it means rapid response) is displayed in the peripheral device 2 or printed on the housing thereof, and the remote control device 1 equipped with a camera reads the QR code through the camera etc. so as to establish and realize the connection between the two.

When the user makes the far-end device 2 enter a specific application by operating the remote control device 1, the far-end device 2 will transmit the information related to the currently running program to the remote control device 1. The remote control device 1 obtains the information as mentioned above through the communication unit 13, and switches to the operation mode which instantly corresponds to the status of the application according to information obtained. The new operation mode will include runtime status information of the application, and provide a new mode of operation, a new feedback and response sound.

The page of the remote control device 1 will be changed continuously along with the continuous operation to the far-end device 2 performed by the user.

When the user select to exit the started application as mentioned above in the far-end device 2 via operating the remote control device 1, the remote control device 1 will switch automatically back to default operation mode, and performs continuously the operation to the far-end system.

When the user exits the browser, or the user exits the interface of the current operation, the remote control device automatically disconnects the WebSocket connection, and ends the control to the far-end device 2.

Figure 3:
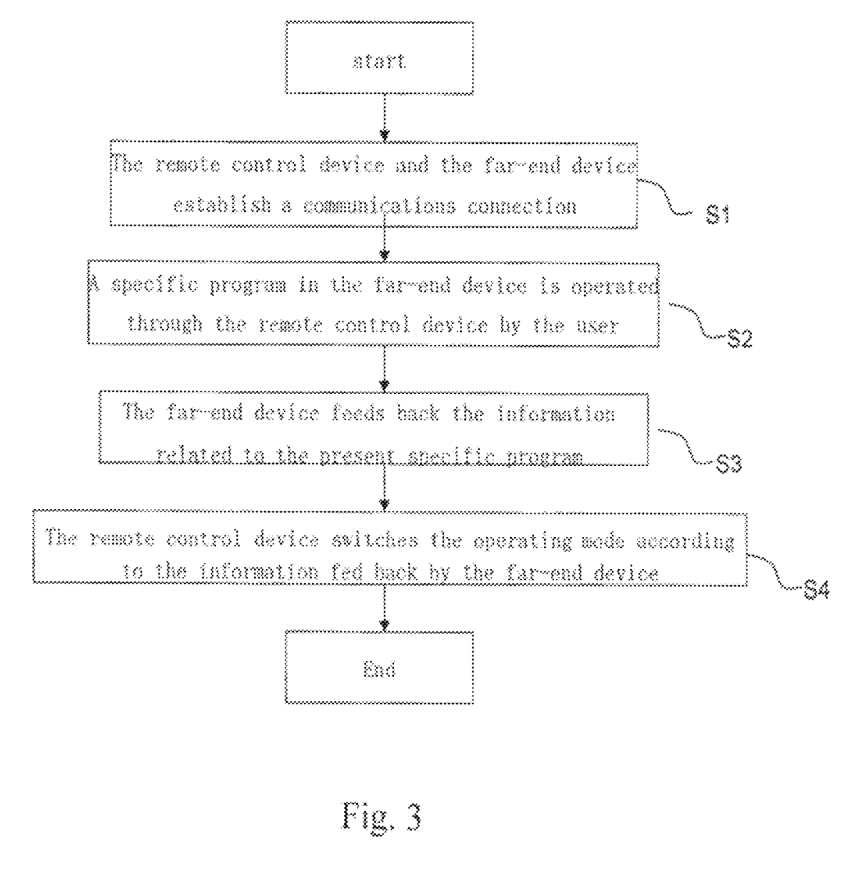
FIG. 3 is a flow chart of the control method in the multimedia system of the present invention.

FIG. 3 is a flow chart of the control method in the multimedia system of the present invention. First of all, the remote control device 1 and the far-end device 2 establish a communications connection (S1); Then, the user operates the remote control device 12 of the remote control device 1 so as to operate a specific program in the far-end device 2(S2); Then, the far-end device 2 responses to the user operation in the operating unit 2 and feeds back the information related to the present specific program (S3); Finally, the remote control device 1 switch the operating mode according to the information fed back by the far-end device (S4).

Figure 4:
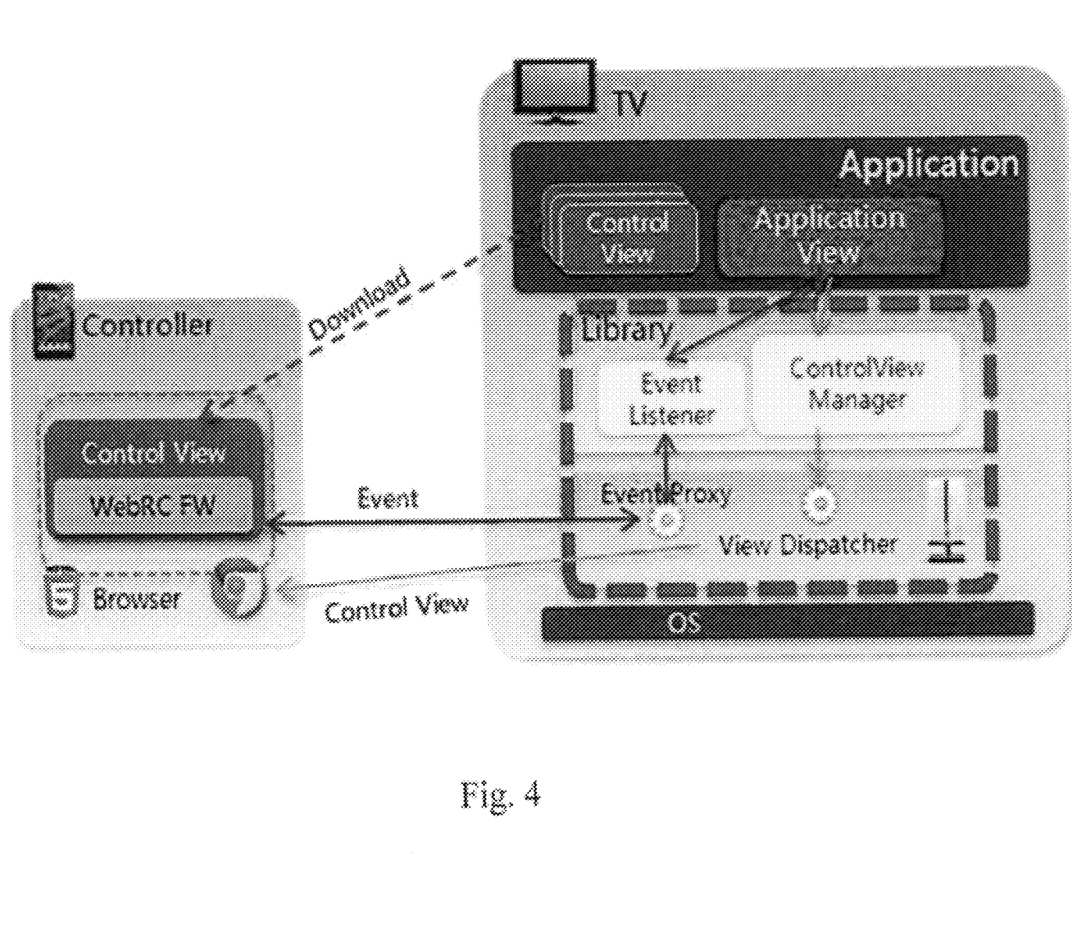
FIG. 4 is a concept chart showing the operation control based on the WebSocket mode performed between remote control device and the far-end device of the present invention.

FIG. 4 is a concept chart showing the operation control based on the WebSocket mode performed between remote control device and the far-end device of the present invention.

As shown in FIG. 4, a WebSocket server is installed in each far-end device 2. The WebSocket connection is established with WebSocket server firstly through that a browser of remote control device 1 is operated by the user.

When the connection is established, the user can control the far-end device 2 by operating the remote control device 1 through the default interface. The control information is transmitted to event agent (EventProxy) of the WebSocket server side. The event agent will call the library files of the corresponding event, and the corresponding action will be operated for simulation on the far-end device 2.

When a user opens a specific application, the control view manager (ControlViewManager) will establish a Socket connection with the WebSocket server side, and the corresponding information started by the application will be transmitted to the View Dispatcher (ViewDispatcher) of the WebSocket server side. The View Dispatcher will broadcast the start information of the application to the client side, i.e. the remote control device 1 by WebSocket. These information includes: a web site address for accessing of the interface corresponding to client side of remote control device 1, the ID of the interface to be displayed by the remote control device 1, namely the identification identifier for identifying the interface to be downloaded.

At the side of the remote control device 1, when such information are obtained, the communication unit 13 accesses the web site address of the external server 3 shown in, for example, FIG. 1 obtained from WebSocket server, downloads the interface corresponding to the control program, and displays the interface of the corresponding ID in the current display interface at the same time. Here, considering the runtime communication, the web site address for downloading and the ID is transmitted instead of directly transmitting the interface data having a big data size. But when the demand to the runtime is not high or when the interface data size does not affect the runtime communication when it is transmitted, the interface data can also be provided from the far-end device 2 to the remote control device 1.

At this time, the user obtained a new control interface, and the present new interface will be loaded with different interfaces and mode of operation and control, which can transmit different event information to WebSocket server. When these events are triggered, the event agent of the WebSockets server side transmits the new event information to the application, and the application program judges whether it is needed to update the interface of the remote control device 1 side according to the detailed changes of the program. If it is needed to update, the updated information will be transmitted from the view transmitter side. This will be repeated, until the user disconnects the connection between the remote control device 1 and the far-end device 2, i.e. the television.

Here the event agent 21 can make two-way connection with the remote control device 1 of the client side through WebSocket; however, when it does not need to update the entire interface, but only needs to update some of the data of the current interface, the event agent will be involved, and the information is transmitted to the Web remote control device side, and the client side will automatically update after receiving the data. Such situation mainly appears in a switch of the interface in the same program.

As mentioned above, the example of the specific operations performed between the remote control device 1 and the far-end device 2 by WebSocket mode based on HTML5. However, the connection between the remote control device 1 and the far-end device 2 can also be the other connection mode based on HTTP but not based on HTML5, or even can be connection mode of universal data transfer protocols other than HTTP.

Hereinafter, a connection mode not based on the mode of HTTP is introduced with reference to FIG. 5.

Figure 5:
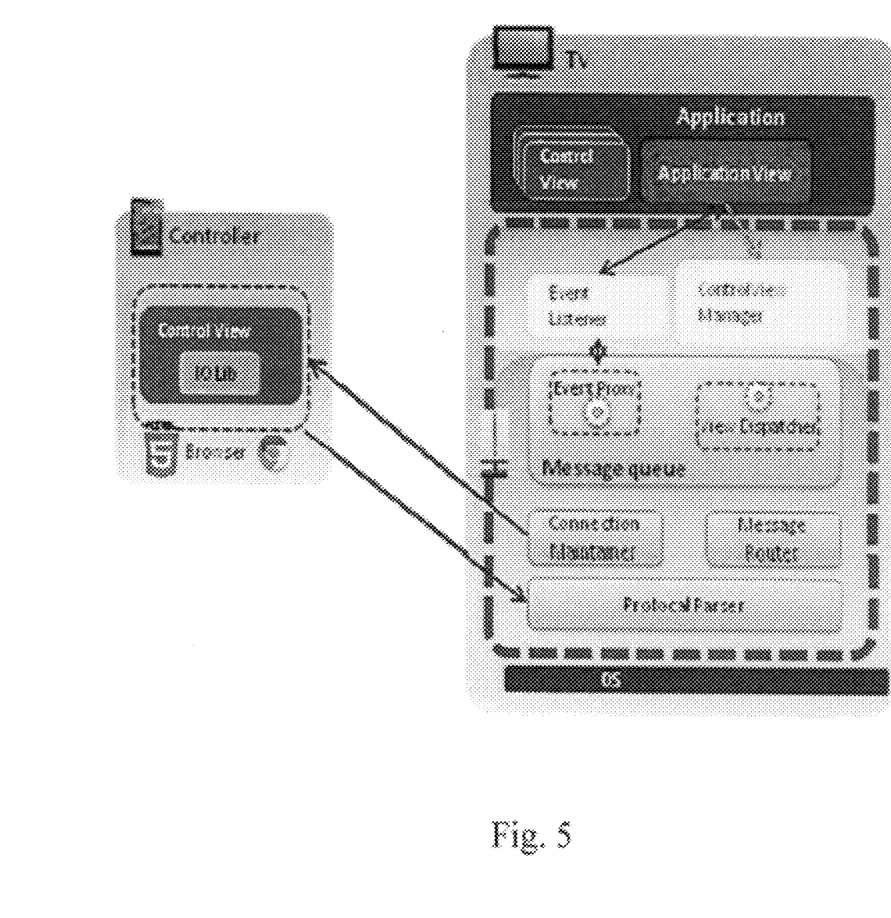
FIG. 5 is a concept chart showing the operation control based on the server push mode performed between remote control device and the far-end device of the present invention.

FIG. 5 is a concept chart showing the operation control based on the server push (server-push) mode performed between remote control device and the far-end device of the present invention. In addition, in the present embodiment, the same sequence number is assigned to the portion having the similar or the same function, and the explanation is omitted.

Because not all devices support HTML5, for the WebSocket browser which does not support HTML5, the WebSocket technology can be replaced by the server push (server-push) technology in order to achieve the same effect.

As same as the multimedia system which is based on the HTML5 mode, as shown in FIG. 5, the multimedia system of the present embodiment includes client side, i.e. the remote control device 1 and the server side, i.e. the far-end device 2.

The javascript library (IO Lib) of the client side packages the realization mode based on the long polling/callback Polling long-polling/callback-polling), and provides an interface consistent with WebSocket.

The client side and the server side communicate by transmitting asynchronous messages with low latency (by http protocol).

The server side is responsible for the parsing of protocol message, the message routing and polling timing control.

When the remote control device 1 is connected to a television as a far-end device 2, the server is told by the way of subscription (the Subscribe), and the initial polling is established through AJAXrequest. If the television has data to be transmitted to the remote control device 1, the server immediately returns the data, otherwise the server maintains a connection, and the server will not return the data until the television has valid data.

As shown in FIG. 5, after the request of the remote control device 1 is parsed, it is distributed by the message router, and if there are data in the message queue (event agent and view transmitter) it is returned immediately, otherwise the present request connection is delivered to the connection maintenance module and the connection maintenance module is notified to perform the data transmission when the message queue is updated. The present mode can minimize the HttpRequest for polling so as to reduce the communication load, and greatly increase the runtime communication at the same time.

As mentioned above, the connection of the WebSocket mode based on HTML5 and the connection of the mode of server push (server-push) not based on HTML5, however, as is explained above, the connection mode as long as based on the universal data transfer protocol is within the protection scope of the present invention.

Hereinafter, an example of the present invention that a screen in the remote control device in the multimedia systems is switched along with the change of the program, which is introduced with reference to FIG. 6.

Figure 6:
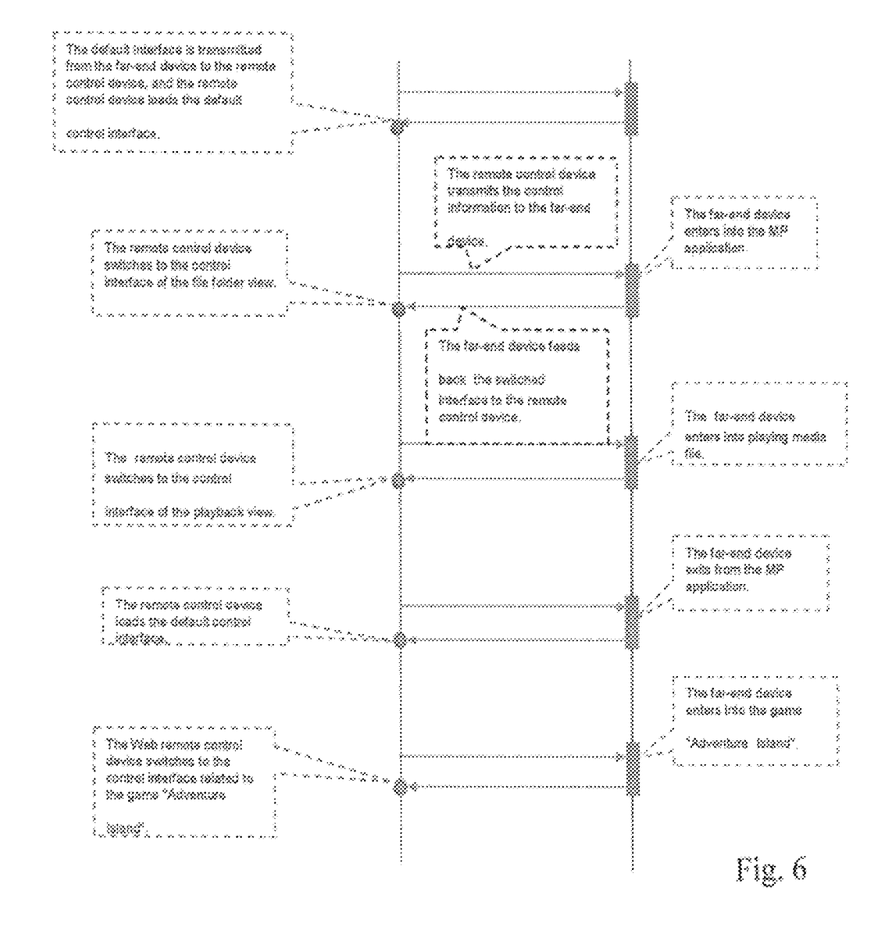
FIG. 6 is a schematic diagram which shows a screen in the remote control device in the multimedia systems in an example of the present invention is switched along with change of the program.

In FIG. 6, the far-end device 2 is a television equipped with a Web server, and the remote control device 1 is a mobile phone with a browser which supports HTML5.

Figure 7:
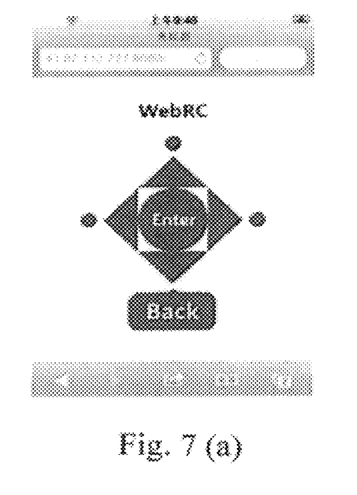
FIG. 7(a) to 7(d) are schematic diagrams which show the switched screen in the multimedia systems in an example of the present invention.

When users operate the remote control device 1 to connect to the far-end device 2 via a browser, firstly, a default interface is transmitted from the far-end device 2, as an example, as shown in FIG. 7(a), the default interface provides basic function of five general key: up, down, left, right, enter, exit. Through the default interface, the user can perform simple operation to the far-end device 2.

After the user starts an application in the far-end device 2, for example, media player (MP), the far-end device 2 will transmit information of screen switching to the remote control device 1, so as to switch to the default control interface file folder view (Folder View) of MP. In the present control interface, the user can perform each various operations such as to delete and to increase the folder to the local media folder of the far-end device 2.

When the user enters a specific folder through the control interface of the folder view, the far-end device 2 will transmit a message, and switch the remote control device 1 to the control interface of the media view (Media View) as shown in FIG. 7(b). At this time, comparing to the control interface of the folder view, the control interface of the media view does not change too much on the overall layout, and it only increases the option of the function of playback so as to adapt the status of the current far-end device 2.

When the user clicks "play", the far-end device 2 will perform playback to the selected multimedia file, and at this time, the remote control device 1 will switch to the playback view (Play View) interface as shown in FIG. 7(c) according to the feedback information transmitted by the far-end device 2. Similarly, the present playback view interface does not change too much on the overall layout either, only the control button is replaced and the amplified, shrink, rotate, play and other functions are provided.

When the user ends the usage of the MP and selects to exit the MP, the remote control device 1 will automatically switch back to the default interface as shown in FIG. 7(a) for the user to select other applications.

For example, when the user selects the game "Adventure Island" installed in the far-end device 2 and enters the game, the remote control device 1 will switch to the control interface (as shown in the figure) related to the game "Adventure Island" based on the feedback information transmitted by the far-end device 2, and then, perform a variety of operation such as start, control, saving, exit.

The remote control device 1 normally operates in accordance with the above described manner. When the user disconnects the connection from the far-end device 2 or closes the control interface, the remote control device 1 will deliver the control to the far-end device 2.

It can be known through the above example that in the remote control device 1 of the present invention, not only the interface corresponding to each program is switched along with the change of the program operated in the far-end device 2, but also the switch of the interface is performed along with the difference of the event even in one program. Moreover, when the overall interface switch is not needed, the partial adjustment can also be performed under the roughly same interface framework. Therefore, the present invention can provide the most particular feeling of handling to the user.

Figure 8:
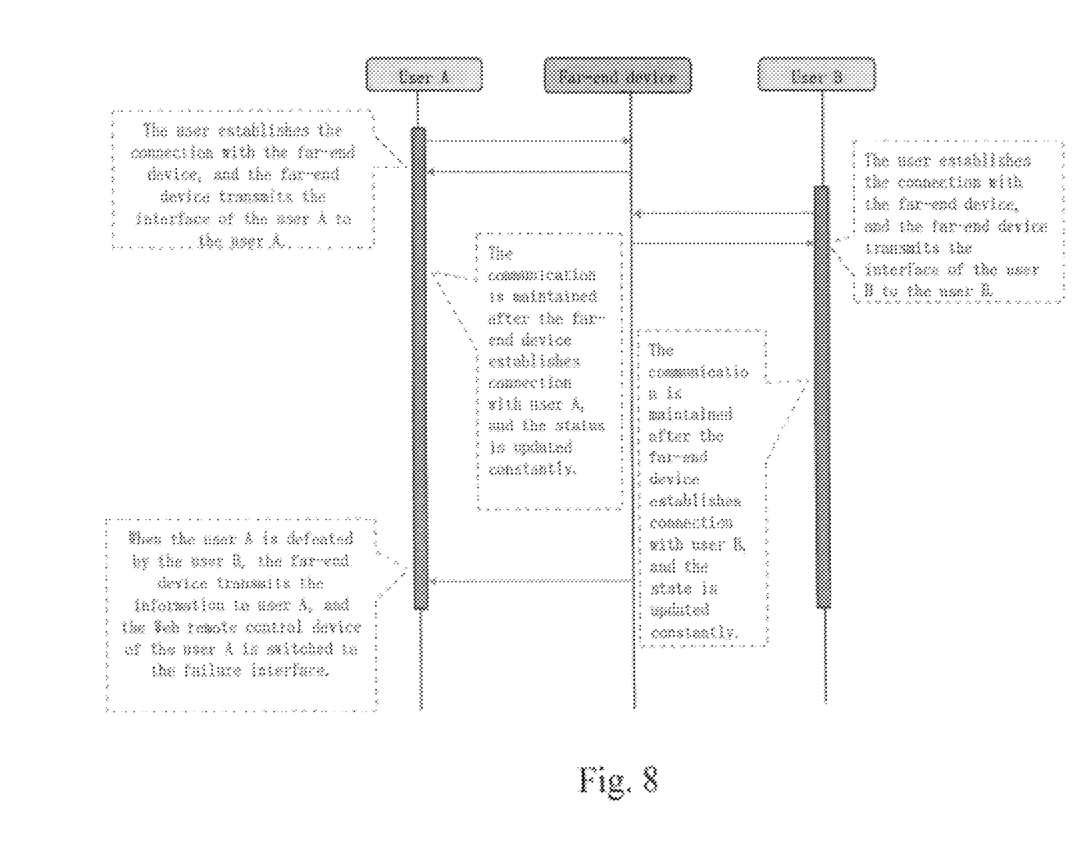
FIG. 8 is a schematic diagram which shows a screen in the remote control device in the multimedia systems in another example of the present invention is switched along with change of the program.

Hereinafter, another example of the present invention that a layout in the remote control device in the multimedia systems in another example of the present invention is switched along with change of the program is introduced with reference to FIG. 8.

In this embodiment, the difference compared with the multimedia system as described in FIG. 6 is as follows: the multimedia system in the present embodiment includes two remote control devices (the remote control device 1a and the remote control device 1b), and the two remote control device can access into one far-end device 2 and can interact within the same Web application, and the acquirement of the control right thereof and the relative data updates are determined by the Web application. In addition, though only two remote control devices are listed in the present example, in fact, more remote control devices can also be added to the present multimedia system according to, for example, the contents of the application, which is very clear for those skilled of the art.

Figure 9:
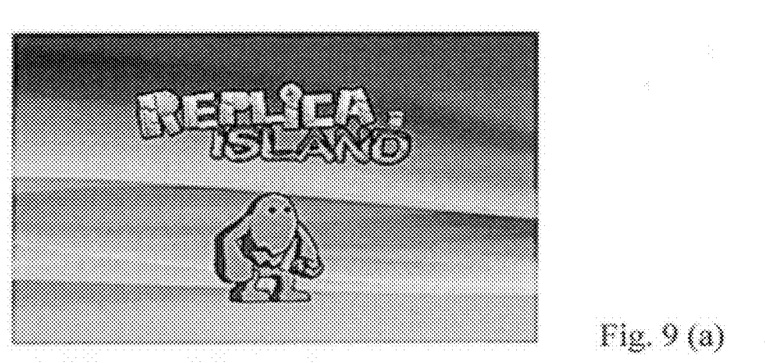
FIG. 9(a) to FIG. 9(c) are schematic diagrams which show the switched screen in the multimedia systems in another example of the present invention.

Still take the game "Adventure Island" as an example to perform the following explanation. First of all, the remote control device 1a of the user establishes the connection with the far-end device 2, and the far-end device 2 transmits the operation interface 1 corresponding to the far-end device 2 as shown in FIG. 9(a) to the user A. Thus the remote control device 1a of the user A obtains the control right of the game character 1.

Then, the remote control device 1b subsequently access to the far-end device 2, and the far-end device 2 feedbacks information to the user B according to the assigned game character, unassigned game character and control right allocation rule, and allocates the control right of the game character 2 to the user B. The remote control device 1b of the user B is switched to the corresponding user interface 2 as shown in FIG. 9(b).

When the remote control device 1a and 1b of the user A and user B have completed the with connection the far-end device 2, the game of fighting each other begins, and the remote control device 1a and 1b of the user A and user B maintain a connection with the far-end device 2. Each user transmits operating instructions to the far-end device 2 through the remote control device 1 device 1a or 1b operated by them, at the same time, the status information are updated constantly. For example, the User A attacks the operation game character of the user B through manipulating the operation game character of the User A, and harms the control game character of the user B. During the process of the present control, the user A transmits attack instruction to the far-end device 2. The far-end device 2 judges damage to the user B according to the calculation, and transmits the corresponding feedback information to the remote control device 1b of the user B. After the remote control device 1b of the user B received the feedback information, it updates the status of the operation game character of the user B, accordingly, changes the interface in the remote control device 1b. For example, the image of the displayed operation game character of the user B is changed as injured image, and so on.

When the User A defeats the User B, the remote control device 1b of the user B will receive the instruction of switching the display interface from the far-end device 2, and then, the remote control device 1b of the user B is switched to the failure interface as shown in FIG. 9(c).

In the present embodiment, by enabling multiple users to participate in the same application (such as game program), the operation among the users can influence each other, so as to achieve the purpose of interaction and provide more experiences to the user.

In addition, in each embodiment as mentioned above, the following contents are introduced, i.e. to provide the interface perfectly matched with the program to the user through changing the interface in the remote control device 1 when the program is switched. However, as mentioned above, in the remote control device 1, not only the displayed interface can be switched, along with the switch to the interface or beyond the switch to the interface, the operation can be performed to the operation sound, background sound, as well as the mode of operation (screen, keyboard or sensor), thus providing a wealth of operating experience.

Hereinafter, an example that the operation mode in the remote control device 1 is switched along with the change of program besides the operation mode outside the switch to the display interface in the remote control device 1 is introduced.

In the device installed any browser which supports HTML5 technology, the remote control device 1 can apply a variety of output means of the device, such as LCD display, LED indicator light, voice output device, vibrator, and so on.

When LCD screen is as the main output component and the remote control device 1 has installed a browser, the user can display information transmitted from the far-end device 2 through the LCD screen. By changing a visual picture of the remote control device 1, the different input and response mode, such as character input, button feedback are provided as the main control mode and to manipulate the far-end device 2. The video characteristic thereof has improved the convenience of the operation of the user, meanwhile, the operation interface updated in runtime has enriched the mode and information of the operation of the user.

When the LCD display is the main output component while the remote control device 1 does not install the browser, through a specific application, the user can establish the connection with the remote control device 1 and the far-end device 2, and can display and switch the information transmitted from the far-end device 2 through the LCD screen.

When the Non-LCD display is the main components of output, the remote control device 1 can change the status of a variety of other output components through a specific application to perform a variety of basic interaction with the user.

1) Using LED light. The status and the information can be displayed by using the LED light according to the predetermined rule of the flashing and the arrangement of the lighting.

Figure 10:
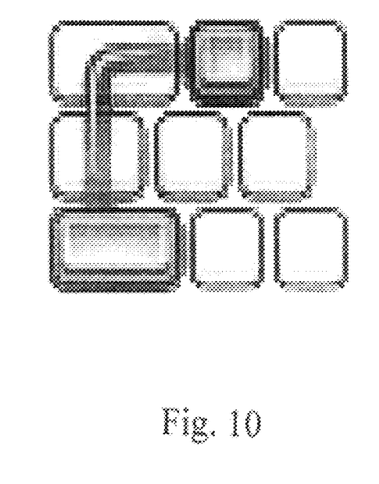
FIG. 10 is a diagram representing an example of keyboard mapping of the remote control device.

2) Using keyboard. Different available keyboard layouts are formed in the remote control device 1 side via the keyboard and according to the information fed back by the far-end device 2, wherein some buttons lost the function of input, and some useable buttons are displayed and stand out by indicator light such as LED to form a unique input mode in the current status, i.e. the keyboard mapping as shown in FIG. 10. As shown in FIG. 10, when the far-end device 2 is in a particular status, only two buttons of the keyboard input device on the remote control device 1 side can be used to input, and various instructions can be issued to the far-end device through the respective functions or the mutual combination of these two buttons.

3) Using voice output device. The current remote control device 1 can also perform a variety of voice prompt through the voice output device based on the information returned by the far-end device 2. The user can issue various commands via voice input to the far-end device 2, which has reached the purpose of interaction.

4) Using a variety of sensors. For example, the state change of the far-end device 2 can be prompted by the remote control device 1 through the shake mode of the remote control device according to the information returned by the far-end device 2.

As mentioned above, the present invention has been illustrated with reference to the drawings combined with the embodiment, and through remote control device, the far-end device, the multimedia system and the control method thereof of the present invention.

In addition, each constitutional element in each embodiment as described in the present invention can be suitably combined with each other, and such combination is within the protection scope of the present invention.

The invention claimed is:

1. A remote control device comprising: circuitry configured to: establish a connection with a far-end device and perform communication; and operate a specific procedure in said far-end device; switch an operating mode in said remote control device according to feedback information associated with the specific procedure which is fed back by said far-end device in response to the operation in said circuitry, the feedback information including runtime information of the specific procedure; and a display screen that displays is configured to display a control interface to operate the specific procedure in the far-end device, wherein the-circuitry is configured to switch what is displayed in the display screen according to the feedback information associated with the specific procedure the circuitry is configured to receive information on a default control interface to control the far-end device, the information on the default control interface being transmitted from the far-end device to the remote control device when the connection with the far-end device is established by the circuitry, and the circuitry is configured to control the display screen to switch from displaying the default control interface to displaying the control interface to operate the specific procedure in the far-end device when the specific procedure is operated by the circuitry based on the runtime information, wherein said remote control device include a keyboard, and circuitry switches a keyboard mapping of said keyboard in-said according to said feedback information, having a pilot lamp set on the keyboard to prompt the status of the remote control device or information about the keyboard mapping, performing various voice prompt according to said feedback information, wherein said remote control device further comprises a sensing vibrator which prompts changes of a status of said far-end device by a manner of vibration of said remote control device according to the feedback information, and the circuitry receives the data of the control interface when a size of the data does not affect a runtime communication.

2. The remote control device according to claim 1, wherein said circuitry establishes connection with said far-end device based on HTTP.

3. The remote control device according to claim 2, wherein said circuitry establishes connection with said far-end device based on WebSocket.

4. The remote control device according to claim 2, wherein said circuitry establishes connection with said far-end device based on server push.

5. The remote control device according to claim 1, wherein after said circuitry quitted said specific procedure in response to the operation of the user, said circuitry switches the interface associated with the specific procedure displayed in said remote control device back to the default control interface.

6. The remote control device according to claim 1, wherein said circuitry establishes said connection with said far-end device via a browser.

7. The remote control device according to claim 6, wherein said circuitry automatically disconnects said communication when the user exits the browser.

8. The remote control device according to claim 1, wherein said feedback information includes an address of website to be accessed by the remote control device and an identifier of the control interface to operate the specific procedure.

9. The remote control device according to claim 1, wherein said circuitry further performs various voice prompt according to said feedback information.

10. The remote control device according to claim 1, further comprising an imaging unit which establishes said connection with said far-end device through said imaging unit reading QR Code on said-end device.

11. A far-end device comprising: circuitry configured to: establish a connection with a remote control device and perform communication; and feedback information associated with a specific procedure in the far-end device to the remote control device according to an operation of the specific procedure in said far-end device operated by said remote control device, the feedback information including runtime information of the specific procedure, wherein the remote control device displays a control interface to operate the specific procedure in the far-end device, the remote control device switches what is displayed in the remote control device according to the feedback information associated with the specific procedure the circuitry is configured to transmit to the remote control device information on a default control interface to be displayed on the remote control device to control the far-end device when the connection with the remote control device is established by the circuitry, and the remote control device switches from displaying the default control interface to displaying the control interface to operate the specific procedure in the far-end device when the specific procedure is operated by the remote control device based on the runtime information, wherein said remote control device include a keyboard, and circuitry switches a keyboard mapping of said keyboard in-said according to said feedback information, having a pilot lamp is set on the keyboard to prompt the status of the remote control device or information about the keyboard mapping, performing various voice prompt according to said feedback information, wherein said remote control device further comprises a sensing vibrator which prompts changes of a status of said far-end device by a manner of vibration of said remote control device according to the feedback information, and the circuitry receives the data of the control interface when a size of the data does not affect a runtime communication.

12. A multimedia system comprising a remote control device and a far-end device, wherein said far-end device comprising: first circuitry configured to: establish a connection with the remote control device and perform communication; and feedback information associated with a specific procedure in the far-end device to the remote control device according to an operation of the specific procedure in said far-end device operated by said remote control device, the feedback information including runtime information of the specific procedure, said remote control device comprising: second circuitry configured to: establish the connection with the far-end device and perform communication; operate the specific procedure in said far-end device; switch an operating mode in said remote control device according to the feedback information associated with the specific procedure that is fed back from said far-end device in response to the operation in said second circuitry, the feedback information including the runtime information of the specific procedure; and a display screen that display is configured to display the control interface to operate the specific procedure in the far-end device, wherein the interface second circuitry is configured to switch what is displayed in the display screen according to the feedback information associated with the specific procedure, the second circuitry is configured to receive information on a default control interface to control the far-end device, the information on the default control interface being transmitted from the far-end device to the remote control device when the connection with the far-end device is established by the circuitry, and the second circuitry is configured to control the display screen to switch from displaying the default control interface to displaying the control interface to operate the specific procedure in the far-end device when the specific procedure is operated by the circuitry based on the runtime information, wherein said remote control device include a keyboard, and circuitry switches a keyboard mapping of said keyboard in-said according to said feedback information, having a pilot lamp is set on the keyboard to prompt the status of the remote control device or information about the keyboard mapping, performing various voice prompt according to said feedback information, wherein said remote control device further comprises a sensing vibrator which prompts changes of a status of said far-end device by a manner of vibration of said remote control device according to the feedback information, and the circuitry receives the data of the control interface when a size of the data does not affect a runtime communication.

13. The multimedia system according to claim 12, wherein a number of said remote control devices is at least two, and the second circuitry of one remote control device in said at least two remote control devices operates the specific procedure in said far-end device; said far-end device sends the feedback information associated with the specific procedure to another remote control device in said at least two remote control devices in response to the operation in the second circuitry of said one remote control device; and the second circuitry in said another remote control device switches the operating mode in said remote control device according to said feedback information.

14. A control method in a multimedia system comprising a remote control device and a far-end device, wherein said control method comprising: a connection step for establishing a communication connection between said remote control device and said far-end device; an operating step for operating a specific procedure in said far-end device; a feedback step for feeding back feedback information associated with the specific procedure which is fed back by said far-end device in response to the operation of the specific procedure in said far-end device operated by said remote control device, the feedback information including runtime information of the specific procedure, a step for displaying in a display screen of the remote control device a control interface to operate the specific procedure in the far-end device, and a mode change step for switching an operating mode of said remote control device according to said feedback information, wherein the mode change step further including a step for switching what is displayed in the display screen according to the feedback information associated with the specific procedure, said control method further comprising: a step of receiving at the remote control device information on a default control interface to control the far-end device, the information on the default control interface being transmitted from the far-end device to the remote control device when the connection with the far-end device is established, and a step of controlling the display screen to switch from displaying the default control interface to displaying the control interface to operate the specific procedure in the far-end device when the specific procedure is operated in the remote control device based on the runtime information, wherein said remote control device include a keyboard, and circuitry switches a keyboard mapping of said keyboard in-said according to said feedback information, having a pilot lamp is set on the keyboard to prompt the status of the remote control device or information about the keyboard mapping, performing various voice prompt according to said feedback information, wherein said remote control device further comprises a sensing vibrator which prompts changes of a status of said far-end device by a manner of vibration of said remote control device according to the feedback information, and the circuitry receives the data of the control interface when a size of the data does not affect a runtime communication.

15. The remote control device according to claim 1, wherein the circuitry receives an address of a website included in the feedback information for downloading the control interface from the website.

16. The remote control device according to claim 1, wherein the circuitry receives data of the control interface from the far-end device.

17. The remote control device according to claim 1, wherein the circuitry transmits event information based on an input from the control interface to the far-end device, and receives updated information on the control interface from the far-end device according to the event information, and the display screen displays an updated control interface according to the updated information.

18. The remote control device according to claim 17, wherein the updated control interface is partly updated from the control interface when the event information indicates only a switch of the control interface in a same program.

* * * * *